Patented Jan. 7, 1930

1,742,317

UNITED STATES PATENT OFFICE

PAUL NAWIASKY, OF LUDWIGSHAFEN-ON-THE-RHINE, AND JULIUS MÜLLER, OF MANNHEIM, GERMANY, ASSIGNORS TO GENERAL ANILINE WORKS, INC., OF NEW YORK, N. Y., A CORPORATION OF DELAWARE

PRODUCTION OF NEW VAT DYESTUFFS

No Drawing. Application filed September 22, 1927, Serial No. 221,396, and in Germany September 22, 1926.

We have found that valuable new vat dyestuffs are produced by treating with alkaline agents the aminobenzanthrone obtainable by reducing the nitrobenzanthrone described in Example 2 of the U. S. Patent No. 876,679. If, for example, the said aminobenzanthrone be fused with alcoholic potash, a brilliant green dyestuff is obtained. Other vat dyestuffs may be obtained by employing other alkaline agents or varying the conditions with regard to proportions, temperature and the like.

Similar valuable vat dyestuffs, which are often identical with the green dyestuff just described are obtained by treating substitution products of the aforesaid aminobenzanthrone, which contain exchangeable substituents in the Bz-1-position, or the N-acylated derivatives thereof with alkaline agents. The temperature employed for the treatment with alkaline agents will generally range between about 120° and 200° C.

The green dyestuffs prepared according to the methods above described are transformed by the action of oxidizing agents into brown vat dyestuffs of excellent fastness. The brown dysestuffs may also be produced on the fibre, by treating the dyeings made with the said green dyestuffs with oxidizing agents such as hypochlorites, fast brown dyeings being produced.

Similar brown vat dyestuffs are also obtained in a simple manner by treating the beforementioned nitrobenzanthrone directly with alkaline agents. The resulting dyestuffs may be purified by treatment with oxidizing agents such as hypochlorite.

The following examples will serve to further illustrate the nature of the said invention but the invention is not limited to these examples. The parts are by weight.

Example 1

A melt of alcoholic potash is prepared by heating 10 parts of potassium hydroxid with 10 parts of ethyl alcohol to 150° C., the excess of alcohol being distilled off. To this melt are added, at 140 to 150° C., 2 parts of the aminobenzanthrone, prepared by reducing the nitrobenzanthrone described in Example 2 of the said U. S. Patent No. 876,679 and corresponding probably to the formula:

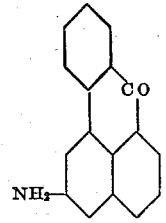

This temperature is maintained until the formation of the dyestuff is complete. The melt is then stirred into water, boiled up, and the resulting dyestuff is separated out by blowing in air, after which it is filtered off by suction, washed with water and dried. It gives strong green dyeings on cotton from a bluish-green vat. The solution of the dyestuff in concentrated sulfuric acid is violet with a reddish tinge. The reaction proceeds probably in accordance with the following equation, but it should be noted that the dyestuff is first obtained in the form of its hydro compound:

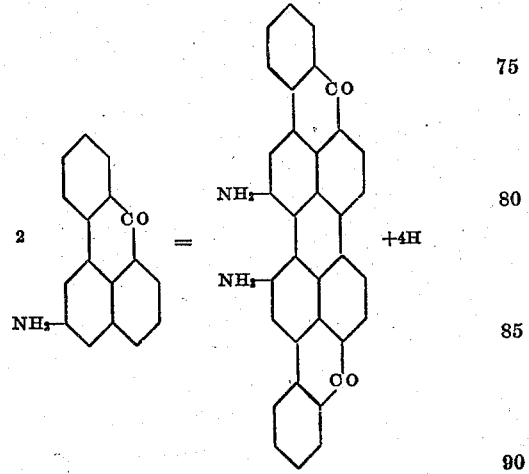

Example 2

3 parts of the aminobenzanthrone used in Example 1 are introduced into 15 parts of fused potassium hydroxid at 200° C., the temperature being then raised to 270 to 280° C. for 20 minutes, with stirring. After cooling, the melt is poured into water, then warmed for a short time, and the dyestuff separated by blowing in air. After being worked up in the usual way, the dyestuff gives grey dyeings on cotton from a blue vat. It dissolves in concentrated sulfuric acid to a violet solution with a reddish tinge. The constitution of the dyestuff is not known.

Example 3

5 parts of the dyestuff, obtained according to Example 1, are brought into a state of fine distribution and suspended in glacial acetic acid. A solution of 10 parts of chromic acid in 400 parts of water is then run in gradually at waterbath temperature, and the whole is heated on the waterbath for several hours The dyestuff after being filtered off by suction and washed until neutral, is then boiled with dilute hypochlorite solution, until the shade, as determined by means of a test portion, is no longer altered. The resulting dyestuff gives handsome, brown, very fast dyeings on cotton from a dark blue vat. The solution of the dyestuff in sulfuric acid is violet with a reddish tinge. We think it probable that the oxidation proceeds in accordance with the following equation:

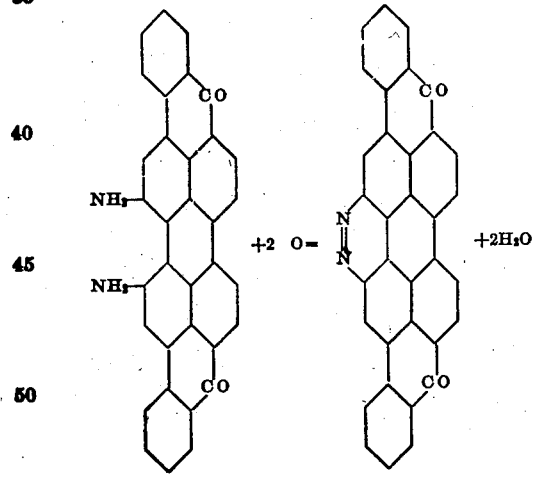

Example 4

10 parts of cotton are dyed, in any known or suitable manner, from the warm hydrosulfite vat with 0.2 part of the green dyestuff obtained according to Example 1, and are then treated for a quarter of an hour with a dilute solution of bleaching powder containing from 0.3 to 0.5 per cent of active chlorine. The original green changes to a rich brown. The reaction proceeds probably as indicated in Example 3.

Example 5

10 parts of amino-Bz-1-brombenzanthrone corresponding probably to the formula:

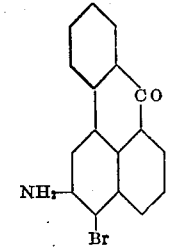

which is obtainable by brominating the acetyl derivative of the aforesaid amino-benzanthrone in glacial acetic acid and saponifying the acetyl compound thus obtained, are introduced into a melt consisting of 50 parts of caustic potash and 50 parts of ethyl alcohol at a temperature of 140 to 145° C., this temperature being maintained for a further hour after all has been added. The melt is then stirred into water, and the dyestuffs precipitated by blowing in air. The precipitate is then filtered off by suction, and dried. The dyestuff thus obtained gives a violet solution in sulfuric acid, and dyes cotton full green shades from the blue vat. The green shade turns brown on treatment with chlorine. The dyestuff is identical with that obtained according to Example 1.

Example 6

10 parts of acetylamino-benzanthrone-Bz-1-thiocresylether obtainable by condensing acetylamino-Bz-1-brombenzanthrone (which may be obtained according to Example 5) with p-thiocresol, are introduced into a melt of 50 parts of caustic potash and 50 parts of ethyl alcohol and further treated as in Example 5. The dyestuff thus obtained is identical with that produced according to Example 5.

Example 7

10 parts of amino-Bz-1-benzanthrone-mercapto-methyl-ether, obtainable by methylating the sodium compound of amino-Bz-1-benzanthrone-mercaptan, which is obtained as a by-product by the reduction of the aforesaid nitrobenzanthrone with sodium sulfid, are treated as described in Example 5. The dyestuff thus produced is identical with that obtained according to the said example.

Example 8

10 parts of the nitrobenzanthrone corresponding probably to the formula:

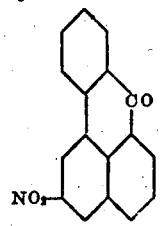

obtainable according to Example 2 of the said U. S. Patent No. 876,679 are introduced into a melt of alcoholic potash, prepared by heating 50 parts of potassium hydroxid with 50 parts of ethyl alcohol. The temperature is maintained at 120° C. for half an hour, and is then gradually raised to 140° C., the alcohol thereby distilling off, and the melt is kept at that temperature until the formation of the dyestuff is completed. When cold, the melt is brought into water, blown with air in order to precipitate the dyestuff which is then filtered off and dried. The resulting dyestuff dissolves to a red-violet solution in concentrated sulfuric acid and gives fast brown dyeings on cotton from the blue vat. A dyestuff of purer shade is obtained by boiling up the crude dyestuff with hypochlorite. The dyeings furnished by this product change into a reddish orange when chlorinated on the fibre.

What we claim is:

1. The process of producing new valuable vat dyestuffs, which consists in treating a substance selected from the group consisting of aminobenzanthrone, obtainable by reducing the nitrobenzanthrone which can be obtained by treating benzanthrone with nitric acid in boiling glacial acetic acid, the substitution products thereof, which contain an exchangeable substituent in the Bz-1-position, and the N-acyl derivatives thereof, with caustic alkali.

2. The process of producing a new valuable vat dyestuff which consists in treating a substance selected from the group consisting of aminobenzanthrone, obtainable by reducing the nitrobenzanthrone which can be obtained by treating benzanthrone with nitric acid in boiling glacial acetic acid, the substitution products thereof, which contain an exchangeable substituent in the Bz-1-position, and the N-acyl, derivatives thereof, in an alcoholic caustic potash melt at temperature of from 120° to 200° C.

In testimony whereof we have hereunto set our hands.

PAUL NAWIASKY.
JULIUS MÜLLER.